United States Patent [19]

Schwerdt

[11] Patent Number: 4,907,787
[45] Date of Patent: Mar. 13, 1990

[54] RUBBER CARTRIDGE SPRING

[75] Inventor: Hans-Werner Schwerdt, Laudenbach, Fed. Rep. of Germany

[73] Assignee: Firma Carl Freudenberg, Weinheim/Bergstr., Fed. Rep. of Germany

[21] Appl. No.: 259,886

[22] Filed: Oct. 19, 1988

[30] Foreign Application Priority Data

Oct. 22, 1987 [DE] Fed. Rep. of Germany ....... 3735697

[51] Int. Cl.⁴ .............................................. F16F 13/00
[52] U.S. Cl. .................................. 267/140.1; 267/293; 277/198; 277/35
[58] Field of Search .............. 267/140.1, 293, 35; 248/562, 636; 277/51, 35, 193, 198

[56] References Cited

U.S. PATENT DOCUMENTS

| | | | |
|---|---|---|---|
| 4,458,888 | 7/1984 | Wolf et al. | 267/140.1 |
| 4,643,405 | 2/1987 | Holfmann et al. | 267/140.1 |
| 4,721,288 | 1/1988 | Andra et al. | 267/140.1 |
| 4,789,144 | 12/1988 | Brenner | 267/140.1 |

FOREIGN PATENT DOCUMENTS 0009120 4/1980 European Pat. Off. .
0034541 2/1985 Japan ................ 267/140.1

Primary Examiner—Andres Kashnikow
Assistant Examiner—Mark T. Le
Attorney, Agent, or Firm—Felfe & Lynch

[57] ABSTRACT

A liquid-filled rubber cartridge spring is composed of an outer tube and a window tube which are mounted statically at rest one inside the other and together define a gap which is sealed at both ends by rings of elastic material adhesively bonded to the window tube and/or to the outer tube. The rings are disposed at the end faces of the window tube and the outer tube has inwardly turned flanges over-reaching the sealing rings and pressing compressively against the latter.

3 Claims, 3 Drawing Sheets

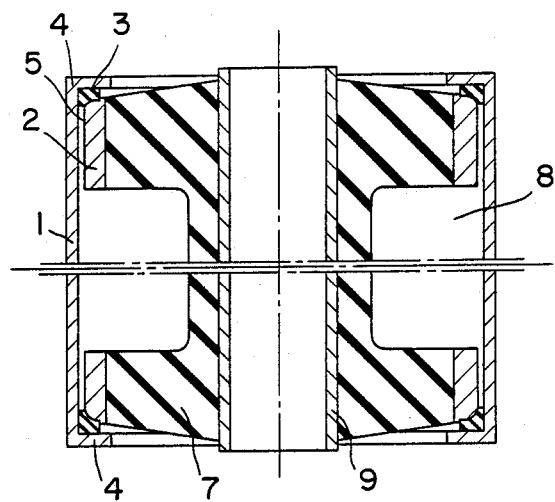
FIG. I

RUBBER CARTRIDGE SPRING

FIELD OF THE INVENTION

This invention relates to a liquid-filled rubber cartridge spring for mounting an internal combustion engine in a motor vehicle, said spring comprising an outer tube and a window tube which are mounted statically at rest inside one another and have between them a clearance which is sealed at both ends by sealing rings of rubber-elastic material adhesively bonded to the window tube and/or the outer tube.

BACKGROUND OF THE INVENTION

Such a rubber cartridge spring is disclosed in Published European Application (EP-A) 0009120. The sealing rings made of rubber are disposed in this case about the outer circumference of the window tube and are provided with a certain oversize with respect to the inside diameter of the outer tube to assure the contact pressure necessary for the achievement of a seal. The amount of the oversize is, however, limited by the necessity of displacing the window tube axially in the outer tube during assembly. The reason for this limitation is that the displacement involves a considerable abrasive stress on the surface of the rings and a corresponding shear stress on the body of material forming the sealing rings. Even if established production tolerances are precisely observed, therefore, the percentage of leaky, that is, faulty rubber cartridge springs is relatively high.

OBJECTS OF THE INVENTION

It is an object of this invention to provide an improved rubber cartridge spring of the type described, the structure of which is such that a decided reduction of the percentage of rejects will result, while avoiding any appreciably greater complexity of manufacture.

Other objects and advantages of the invention will become apparent as the description thereof proceeds.

DESCRIPTION OF THE INVENTION

The above object is achieved in accordance with the invention in that the sealing rings are disposed at the end faces of the window tube, that the outer tube is provided with projecting flanges inwardly overreaching the ends of the sealing rings and that the projecting flanges and the sealing rings are resiliently and sealingly urged against one another.

In the rubber cartridge spring of the instant invention, the outside diameter of the window tube is slightly smaller than the inside diameter of the outer tube.

The insertion of the window tube into the outer tube is thus extremely simple and cannot result in damage to the sealing rings.

An embodiment which can be used as the outer tube is provided at one end with an inwardly reaching flange before the introduction of the window tube. The sealing ring disposed on the related end face of the window tube can be supported on the flange while the window tube is being inserted, so that it is then necessary only to roll inwardly the margins of the other end of the outer tube projecting axially past the other end of the window tube, and this can be done, for example, by a beading operation. Also, it is easily possible to do this while the assembly is immersed in an inert liquid, for instance an antifreeze mixture of ethylene glycol and water, which facilitates the complete filling of all the open space in the rubber cartridge spring with the liquid.

The window tube can also be inserted into this outer tube while the latter is still in completely cylindrical shape. In this case care must be taken to achieve a precise axial alignment of the two tubes while the ends of the outer tube which project axially beyond the window tube are being rolled radially inwardly to form the flanges. This can be done simultaneously with the beading operation and represents a time-saving step in the production of the rubber cartridge spring.

By the appropriate configuration of the cross section of the sealing ring and/or by the inclination of the surfaces which are to support the window tube axially in the assembled state of the rubber cartridge spring, it is relatively easy to ensure that the annular gap between the outer tube and the window tube will be sealed in a reliable manner.

The action of vibrations and the aging of the available rubber-elastic materials can no longer impair the excellent results achieved in this regard.

An additional advantage of the rubber-cartridge spring of the instant invention is that assembly-caused bias in the corresponding supporting springs is reliably prevented. The identity between the originally targeted resilience of such rubber cartridge springs and their actual resilience when manufactured is thereby decidedly improved.

The rings of the rubber cartridge springs which seal the gap can be made integral with the supporting springs of rubber-elastic material. This will avoid any increase in cost over the known methods of manufacture.

BRIEF DESCRIPTION OF THE DRAWINGS

The subject matter of the present invention will be illustrated below with the aid of the appended drawing, wherein:

FIG. 1 is a longitudinal cross section of a rubber cartridge spring of the instant invention;

Figure 4:
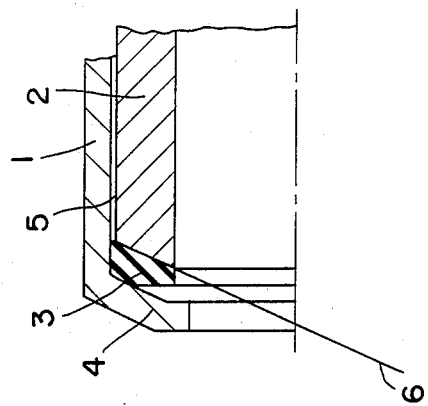
FIGS. 2 to 7 show details of rubber cartridge springs similar to the kind shown in FIG. 1, in which the profile of the sealing rings or of the parts surrounding the sealing rings when the rubber cartridge springs are ready for use is configured in different ways.

The rubber cartridge spring shown in longitudinal section in FIG. 1 includes an outer tube 1 and an inner tube 9 which are axially parallel with one another.

The inner tube 9 is joined to a window tube 2 by supporting spring 7 made of rubber-elastic material, and the two together surround chambers 8 which are closed off radially from the exterior by outer tube 1 and are filled with an inert liquid, preferably an antifreeze liquid. Sealing rings 3, which may optionally be integral with supporting spring 7 and may be made of the same rubber-elastic material, are situated at the end faces of window tube 2, and in the completely assembled rubber cartridge spring they are axially compressed between the ends of window tube 2 and flanges 4 projecting radially inwardly from outer tube 1. Both ends of window tube 2 are beveled outwardly in mirror-image symmetry to one another, so that, with increasing distance from the axis of the rubber cartridge spring, the distance between the two end faces diminishes. Sealing rings 3, also made of rubber-elastic material, thereby undergo during their axial compression between the metal surfaces of outer tube 1 and those of window tube 2, a displacement into gap 5 that is to be sealed. The latter is thereby reliably and lastingly sealed.

Figure 2:
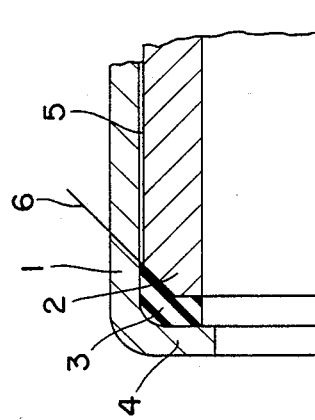

FIGS. 2 to 7 show enlarged sections of various embodiments of area A of FIG. 1. In the embodiment of FIG. 2, the end face of window tube 2 is beveled only in the area of its outer circumference. The axial load bearing capacity of window tube 2 with respect to outer tube 1 is thereby improved.

Figure 3:
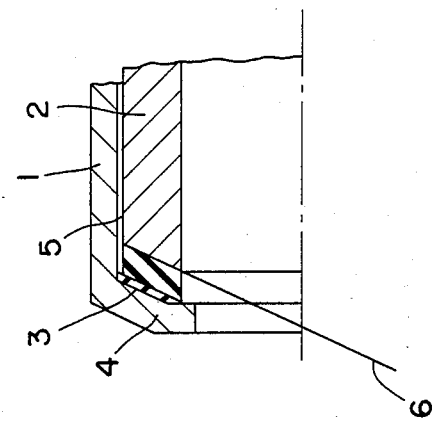

In the embodiment shown in FIGS. 2 and 3 the sealing ring 3 has the cross-sectional shape of a parallelogram which, during axial compression against flange 4, comes into contact with it first in the area of its inside circumference. In this case as well, continued compression results in an increasing displacement of sealing 3 ring into gap 5 which is to be sealed.

In the embodiment in FIG. 4, the cross-section of sealing ring 3 is of such shape that its axial compression between the end of window tube 2 and flange 4 of outer tube 1 easily forces the sealing ring axially into gap 5 which is to be sealed. The gap is thereby easily sealed, making it unnecessary to apply extreme contrary compression forces. For example, such designs are advantageous for the insulation of high-frequency vibrations.

Figure 5:
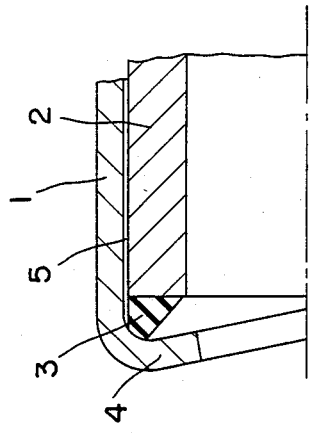
Figure 6:
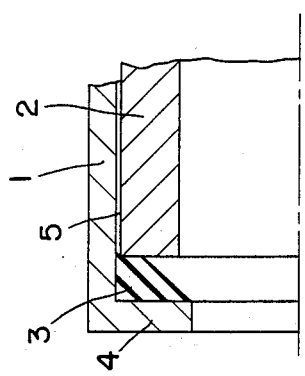
Figure 7:
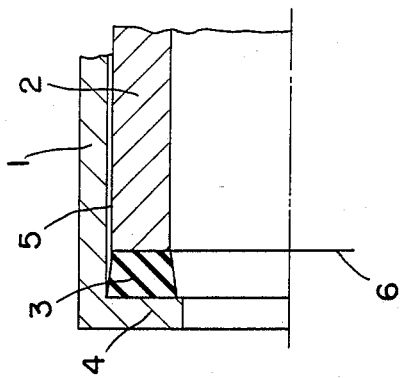

The same ease of sealing is found in the embodiment shown in FIGS. 5 and 6. In the embodiment of FIG. 7, sealing ring 3 has a rectangular cross-section. During its compression between surface 6 of window tube 2 and of flange 4 it undergoes primarily an outward displacement in both directions, thereby reliably sealing gap 5.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

I claim:

1. A liquid-filled rubber cartridge spring comprising an outer tube (1) and a window tube (2) which are mounted within one another when statically at rest and together define a gap (5), said gap being sealed at both ends by sealing rings (3) made of rubber-elastic material adhesively bonded to one of said window tube and said outer tube, where said sealing rings are disposed on end surfaces (6) of said window tube, the ends of said outer tube are provided with inwardly reaching flanges (4) overreaching said sealing rings, the flanges and sealing rings being compressed resiliently against one another in a sealing manner, said end surfaces and said flanges being at a radially outwardly expanded axial distance from one another, and said end surfaces having an at least partial conical configuration.

2. A rubber cartridge spring of claim 1, wherein the radial extend of said gap between said window tube and said outer rube is smaller than the average thickness of said sealing rings in the axial direction.

3. A rubber cartridge spring of claim 1, wherein said sealing rings have a length in the axial direction which increases in the direction of the outer circumference of the rubber cartridge spring.

* * * * *